(12) United States Patent
Turudich

(10) Patent No.: US 7,108,667 B1
(45) Date of Patent: Sep. 19, 2006

(54) BICYCLE SADDLE WITH VIBRATING MASSAGER

(76) Inventor: Bob Turudich, 2106 Albury Ave., Long Beach, CA (US) 90815

( * ) Notice: Subject to any disclaimer, the term of this patent is extended or adjusted under 35 U.S.C. 154(b) by 0 days.

(21) Appl. No.: 10/831,282

(22) Filed: Apr. 26, 2004

Related U.S. Application Data

(63) Continuation of application No. 10/212,192, filed on Aug. 5, 2002, now abandoned.

(51) Int. Cl.
*A61H 1/00* (2006.01)
(52) U.S. Cl. ......................................... 601/57; 297/202
(58) Field of Classification Search ............ 610/56–57; 297/195.1, 202, 217.1, 217.3
See application file for complete search history.

(56) References Cited

U.S. PATENT DOCUMENTS 3,771,827 A * 11/1973 Winfree ................. 297/188.08
5,344,437 A * 9/1994 Pistay ......................... 607/109
5,692,801 A * 12/1997 Yu ............................. 297/195.1
6,149,230 A * 11/2000 Bontrager ................... 297/202
6,422,647 B1 7/2002 Turudich
D475,208 S * 6/2003 Massey ....................... D6/354
6,592,510 B1 * 7/2003 Plentev ......................... 600/14

* cited by examiner

*Primary Examiner*—Michael A. Brown
(74) *Attorney, Agent, or Firm*—Edgar W. Averill, Jr.; Kenneth L. Green

(57) ABSTRACT

An improved bicycle saddle having a shell which supports at least one battery operated vibrator. When the vibrator is energized, its vibration causes the shell and therefore the bicycle seat to vibrate. The vibrator has an on/off switch so that it may be turned on periodically by the rider to improve the comfort of the bicycle saddle. The bicycle saddle is preferably supported by a rail which has two arms which extend from the front of the underside of the shell to near the back of the shell. A bearing is affixed about the end of each of the arms so that the arms may move inwardly and outwardly along the underside of the shell as the shell is flexed. The shell preferably has a central, angled valley and the saddle is flexible to provide further comfort.

8 Claims, 2 Drawing Sheets

BICYCLE SADDLE WITH VIBRATING MASSAGER

CROSS REFERENCE TO PRIOR APPLICATIONS

This application is a continuation of applicant's prior patent application, Ser. No. 10/212,192, filed Aug. 5, 2002 now abandoned.

BACKGROUND OF THE INVENTION

The field of the invention is saddles and the invention relates more particularly to saddles for bicycles, although such saddles may also be used on motorbikes, car seats, chairs, truck seats, seats for gym equipment or for any seat for human use. The invention will be described by way of a bicycle saddle, but the design criteria, of course, can be used for other saddles.

There has always been a desire to provide bicycle saddles which are comfortable for the rider. In addition, there is a desire for the bicycle saddle to be light in weight and small in size which tends to make it more challenging to create a comfortable saddle.

One way of increasing comfort is to provide a longitudinal opening along the saddle as shown in applicant's U.S. Pat. No. 6,422,647.

BRIEF SUMMARY OF THE INVENTION

The present invention is for an improved bicycle saddle having a shell with a pad on its upper surface. A lower surface of the shell supports a rail which holds the saddle to a bicycle. At least one battery operated vibrator is supported by the shell so that when the vibrator vibrates the vibration is transferred to the shell which causes the bicycle saddle to vibrate. The vibrator is preferably manually operated by an on/off switch near the front of the saddle so that it may be used periodically by the rider to increase blood circulation and comfort when desired. The vibrator preferably has an integrated battery operated motor which rotates a shaft to which an eccentric weight is affixed to provide the desired vibration.

An additional way of improving the comfort of the saddle is to form the saddle in a shallow V-shape where there is a longitudinal valley along the upper surface of the saddle which rises from a central longitudinal axis upwardly away from the center at an angle of between about 25° and 35°. The shell is sufficiently flexible so that as the rider exerts pressure on the seat the seat flexes toward a more horizontal orientation. This flexion is permitted by the shape of the shell itself and is supported by the rear of the shell of the saddle by a pair of bearings affixed to the rail which holds the saddle to the bicycle. The bearings ride along the under surface of the shell and do not inhibit the flexing of the shell.

DESCRIPTION OF THE PREFERRED EMBODIMENTS

Figure 1:
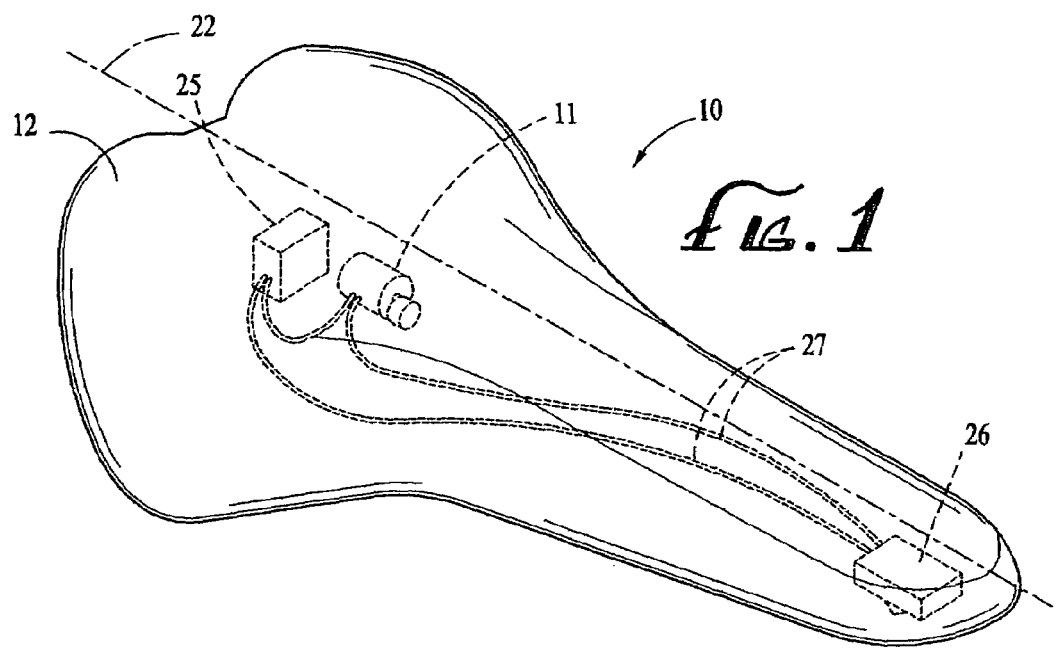
FIG. 1 is a perspective view showing the top and right hand side of the saddle of the present invention and showing a vibrator in phantom view.

The improved bicycle saddle of the present invention is shown in perspective view in FIG. 1 and indicated generally by reference character 10. Saddle 10 has an integrated battery operated vibrator 11 shown in phantom view affixed to the under surface thereof. The term "integrated battery" is intended to mean a small motor in which the battery is held within the motor housing. Saddle 10 has an upper pad 12 which is placed over a shell shown best in FIG. 3 of the drawings and indicated by reference character 13.

Figure 2:
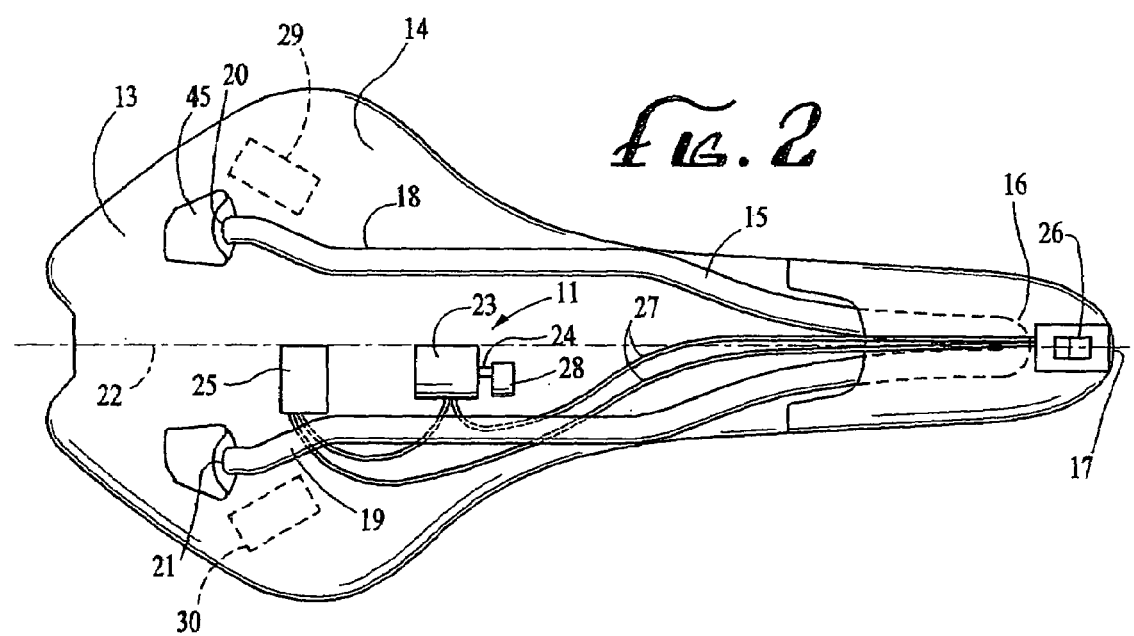
FIG. 2 is a bottom surface view thereof.

The bottom of the shell 13 is shown in FIG. 2 and indicated by reference character 14. The shell 13 supports a rail 15 which is generally U-shaped and has a base 16 held near the front 17 of shell 13. Rail 15 has two arms 18 and 19 which have a right terminus 20 and a left terminus 21 affixed to the underside of shell 13.

Vibrator 11 in FIG. 2 is affixed along a central longitudinal axis 22 and is supported by shell 13. Vibrator 11 has a motor 23 which drives a rotating output shaft 24. An eccentrically mounted weight 28 is turned by shaft 24 and causes the shell 13, and thus saddle 10, to vibrate when shaft 24 turns. Shaft 24 preferably turns at a rate in excess of 3,000 RPM. The eccentrically mounted weight would typically weigh about 56 mg and have an outside diameter of about ⅝". While rotating weight is shown as a means of causing vibration, other means for causing vibration may, of course, be used. A battery 25 energizes the motor 23. The battery is preferably 3–6 volt and may or may not be rechargeable. The vibrators may be located near the front, near the center, or near the rear of the saddle since the shell will vibrate as a unit.

A manually operated switch 26 is preferably positioned adjacent the front 17 of shell 13 so that the rider can easily turn the motor on and off. A pair of conductors 27 lead from switch 26 to vibrator 11.

The vibrator need not be a single vibrator and a second or third vibrator may be added as indicated by the dotted lines indicated by reference characters 29 and 30 in FIG. 2.

Figure 3:
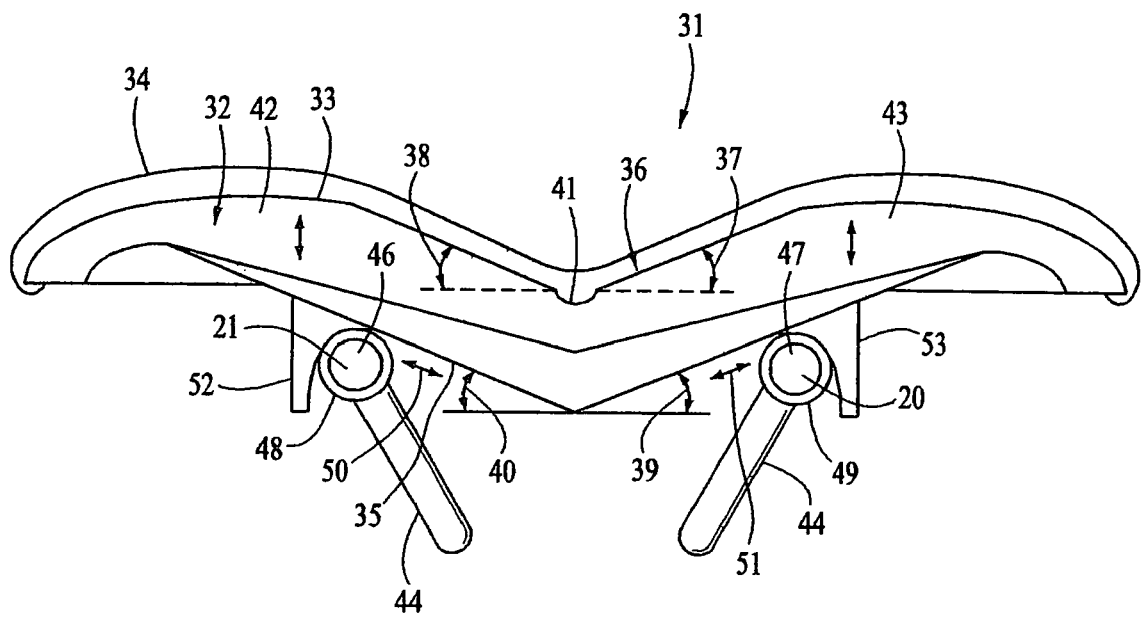
FIG. 3 is a rear surface view of a V-shaped embodiment showing the shell of the saddle being supported by a rail through a pair of bearings.
Figure 4:
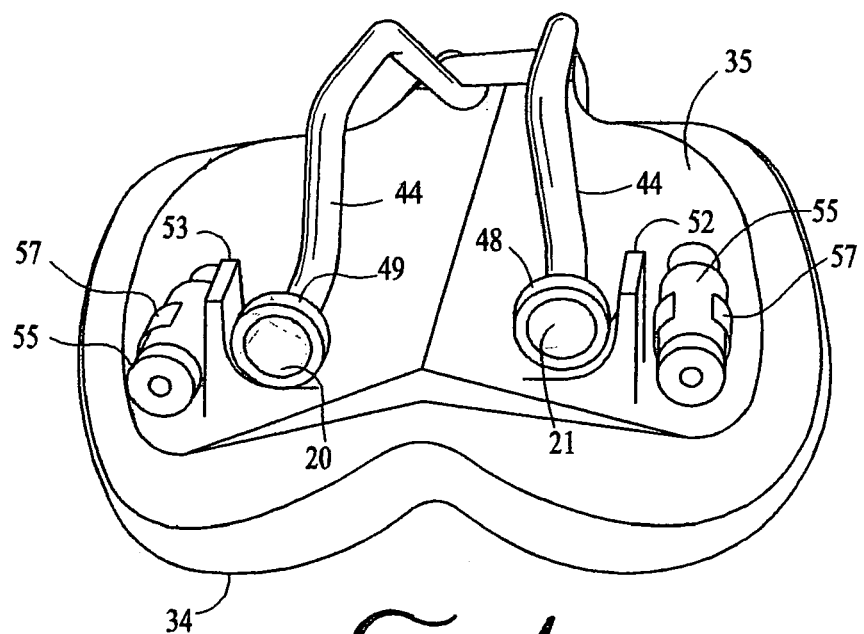
FIG. 4 is a perspective view showing the rear and bottom of the saddle of FIG. 3.

An additional comfort feature is indicated in FIGS. 3 and 4 of the drawings where saddle 31 can be seen from a rear view to have a shell 32 having an upper surface 33 covered by a pad 34. The lower surface of the shell 32 is indicated by reference character 35.

Shell 32 is formed with a central valley indicated generally by reference character 36 which is formed at an angle 37 with respect to the horizontal on the right side and by an angle 38 from the horizontal on the left side. Analogous angles 39 and 40 are formed on the lower surface 35 of shell 32 and a central notch 41 is formed along the central longitudinal axis 22 to assist in the flexing of the right half 43 and the left half 42 of the shell.

In order to permit the flexure of shell 32, the rail 44 is not affixed to the underside of the shell as shown in FIG. 2 by supports 45, but instead, is permitted to move along the lower surface 35 of shell 32, as described below. In place of supports 45 which are part of the shell, a pair of bearings 46 and 47 are affixed near right terminus 20 and left terminus 21, respectively. Bearings 46 and 47 have an external rotatable ring 48 and 49. These rings permit the right and left terminus to move inwardly and outwardly as indicated by arrows 50 and 51.

Bearing stops 52 and 53 limit the amount of outward movement of rail 44. The front end of rail 44 is analogous to that shown in FIG. 2 and is held near the front of saddle 31, as shown best in FIG. 4 of the drawings.

The saddle 31 may or may not be equipped with a vibrator or vibrators as its flexure adds comfort even without the presence of one or more vibrators. Ultimately vibrators provide further comfort and are preferred as additions to the saddle shown in FIGS. 3 and 4. Vibrators 54 and 55 are shown in FIG. 4 and are of the type which have an integrated battery. Vibrators 54 and 55 are held against the underside of seat 31 by clips 56 and 57. The vibrators may be removed by lifting them out of clips 56 and 57, if desired. An on/off switch (not shown) is preferably located in the front of the saddle and wiring to the motors of the vibrators 54 and 55 can be embedded in the shell 52.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An improved bicycle saddle having a shell, said shell having an upper surface supporting a pad and a lower surface supporting a rail which holds the saddle to a bicycle wherein the improvement comprises:

said shell having a central bisecting longitudinal axis dividing the shell into a right half and a left half and an upper and a lower surface of said right half of said shell adjacent said longitudinal axis being angled upwardly at an angle of from about 25 degrees to about 35 degrees from the horizontal and the upper and lower surface of said left half of said shell adjacent said longitudinal axis being angled upwardly at an angle of from about 25 degrees to about 35 degrees from the horizontal and wherein said rail is generally U-shaped and is oriented so that a base of said U-shaped rail is affixed adjacent a forward edge of said shell and two arms of said U-shaped rail extend rearwardly with respect to said saddle to a right and a left rear terminus under said shell and said two arms support said shell through a pair of bearings affixed to said rail, each of said bearings having an outer rotatable ring, one bearing being affixed about each arm near its terminus whereby the outer rotatable ring of each of said bearings provide vertical support against the lower surface of said shell while allowing the bearings to move inwardly or outwardly on said lower surface as said shell flexes, whereby when a rider sits on the saddle the right and left halves of said saddle flex downwardly about said bisecting longitudinal axis.

2. The improved bicycle saddle of claim 1 wherein the lower surface of said shell having a pair of bearing stops extending downwardly from said shell and positioned to limit the outward movement of said bearings.

3. An improved bicycle saddle having a shell, said shell having an upper surface supporting a pad and a lower surface supporting a rail, which holds the saddle to a bicycle wherein the improvement comprises:

said shell having a central bisecting longitudinal axis including a longitudinal central notch dividing the shell into a right half and a left half and an upper and a lower surface of said right half of said shell adjacent said central notch being angled upwardly at an angle from about 25° to about 35° from the horizontal, and the upper and lower surface of said left half of said shell adjacent said central notch, being angled upwardly at an angle of from about 25° to about 35° from the horizontal, wherein the said rail has a right arm and a left arm extending rearwardly from a forward area of said saddle to a right and a left terminus under said shell and two arms support said shell against said lower surface.

4. An improved bicycle saddle having a shell, said shell having an upper surface and a lower surface, and said shell supported by a rail, which rail connects the saddle to a bicycle, wherein the improvement comprises:

a right rail arm of the rail having a right terminus including a right bearing; and a left rail arm of the rail having a left terminus including a left bearing;

a right shell half supported at a right rear by the right bearing; and a left shell half supported at a left rear by the left bearing, wherein:

the shell forms a shallow V-shape including a longitudinal valley along the upper surface of the saddle, which longitudinal valley rises upwardly away from a central longitudinal axis at an angle of between about 25 decrees and about 35 degrees above the horizontal; and the shell is sufficiently flexible so that as the rider exerts pressure on the saddle, the shell flexes.

5. The saddle of claim 4, wherein shell is sufficiently flexible so that as the rider exerts pressure on the seat the seat flexes toward a more horizontal orientation.

6. The saddle of claim 4, wherein the bearings do not inhibit the flexing of the shell.

7. The saddle of claim 4, wherein the right arm and the left arm extend rearwardly from a forward area of said saddle to the right terminus and the left terminus under said shell and two arms support the lower surface of the shell.

8. The saddle of claim 4, wherein the flexion of the shell is permitted by:

the shape of the shell; and the support of the rear of the shell by the bearings.

* * * * *